United States Patent [19]

Ohnishi

[11] Patent Number: 4,576,323
[45] Date of Patent: Mar. 18, 1986

[54] FILLET-WELDING EQUIPMENT FOR PIPE MATERIALS
[75] Inventor: Yutaka Ohnishi, Akishima, Japan
[73] Assignee: Tachikawa Spring Co., Ltd., Tokyo, Japan
[21] Appl. No.: 558,529
[22] Filed: Dec. 6, 1983
[30] Foreign Application Priority Data Dec. 9, 1982 [JP] Japan .......................... 57-186305[U]

[51] Int. Cl.⁴ ............................................. B23K 27/00
[52] U.S. Cl. ......................................... 228/29; 228/45
[58] Field of Search ...................... 228/27, 28, 29, 45, 228/47; 219/60 A, 60 R, 125.11, 125.12

[56] References Cited
U.S. PATENT DOCUMENTS

| 3,841,547 | 10/1974 | Bartley | 228/29 |
| 4,091,514 | 5/1978 | Motes-Conners et al. | 228/29 |
| 4,145,593 | 3/1979 | Merrick et al. | 219/60 A |
| 4,236,060 | 11/1980 | Butz | 219/125.11 |
| 4,365,132 | 12/1982 | Kazlauskas et al. | 228/29 X |
| 4,386,726 | 6/1983 | Taff | 228/29 |

FOREIGN PATENT DOCUMENTS

| 5016743 | 2/1980 | Japan | 219/60 A |
| 192321 | 8/1967 | U.S.S.R. | 219/60 A |

Primary Examiner—Nicholas P. Godici
Assistant Examiner—M. Jordan
Attorney, Agent, or Firm—Cushman, Darby & Cushman

[57] ABSTRACT

A new and improved fillet welding equipment is disclosed which can be used to butt a pipe member against a plate-like surface and then weld the entire periphery of the butted pipe member. In this fillet welding equipment, a pair of welding torches are arranged such that their respective nozzles are opposed to and spaced about 90 degrees from each other. This pair of welding torches can be rotationally moved simultaneously and continuously through their respective predetermined ranges of about 90 degrees to weld one half round section of the entire periphery to be welded, which results in the reduced welding time.

2 Claims, 5 Drawing Figures

FILLET-WELDING EQUIPMENT FOR PIPE MATERIALS

BACKGROUND OF THE INVENTION

1. Field of the Invention

The present invention relates to fillet welding equipment for butting a pipe material such as a pipe against a plate-like surface and then fillet-welding it over its entire outer periphery.

2. Description of the Prior Art

Conventionally, this type of fillet-welding equipment is arranged to perform two separate and successive welding operations, each of which covers one-half of the entire periphery of a pipe member to be welded, that is, an angular range of 180 degrees must be treated twice successively but separately to complete a full round welding operation. Thus, a welding torch must be rotated 180 degrees at each half round relative to the pipe member to be welded, which consumes time and provides an unsatisfactory working efficiency.

Also, since the range of the angular movement of the welding torch is as wide as 180 degrees, the whole welding equipment of this type must be large in size. Of course, the large-size welding equipment is practically disadvantageous in that it is greatly restricted by its location of installation.

SUMMARY OF THE INVENTION

Accordingly, in view of the above mentioned drawbacks found in the prior art welding equipment, the principal object of the invention is to provide a novel and improved fillet-welding equipment.

Upon further study of the specification and appended claims, further objects, features, and advantages of the present invention will become more fully apparent to those skilled in the art to which this invention pertains.

In brief, the above object as well as further objects, features, and advantages of the present invention can be attained by mounting at least one pair of welding torches to a movable member provided on the base body of the welding equipment of the invention to be rotationally movable in a longitudinal direction of the welding equipment such that the nozzles of the welding torches are opposed to and spaced about 90 degrees apart from each other in the longitudinal direction as well as such that the welding torches can be moved upwardly or downwardly. In other words, according to the invention, the two welding torches are respectively moved relative to a circular periphery to be welded in the respective ranges of about 90 degrees contained in the same half round portion of the circular periphery in a simultaneous and corresponding manner, so that the half round portion of the circular periphery to be welded can be welded simultaneously and continuously by 90-degree ranges.

In order that each of the two welding torches can be rotationally moved in its predetermined range of about 90 degrees, the movable member of the invention is arranged such that it mounts two pinions respectively on its both sides, that these two pinions are intermeshed respectively with associated racks provided in the base body and each formed in an arc shape having the same center as that of the circular periphery to be welded, and that such pinions can be actuated by a motor so as to move the arc-shaped racks therewith.

Also, the welding torch of the invention is mounted such that it can be moved downwardly or upwardly by a cylinder. When the cylinder is lowered, the welding torch is caused to jet out its welding flame from its nozzle and blow it against the circular periphery to be welded, and, at the same time, the pinion of the movable member intermeshed with its associated arc-shaped rack is started to rotate along the rack and this rotational movement of the pinion continues until the welding torch has been rotated approx. 90 degrees, i.e., the welding torch reaches the extreme end of its given range of movement.

Thus, according to the invention, a half round section, i.e., a range of 180 degrees of the circular periphery to be welded can be welded by a pair of front and rear welding torches simultaneously with each of the welding torches covering its given range of about 90 degrees. Therefore, the range of movement of each of the welding torches of the invention is reduced to approximately a half when compared to the movement range of the welding torch employed in the prior art welding equipment which welds the half round section continuously by a single welding torch. This results in the reduction of the welding time and thus in the improved working efficiency.

Also, because of the smaller range of movement of the welding torch, the whole welding equipment can be compactly designed. This permits reduction of costs and is also advantageous for installation purposes.

BRIEF DESCRIPTION OF THE DRAWINGS

The present invention is explained with reference to the accompanying drawings illustrating a preferred embodiment of the invention.

DETAILED DESCRIPTION OF A PREFERRED EMBODIMENT OF THE PRESENT INVENTION

Figure 1:
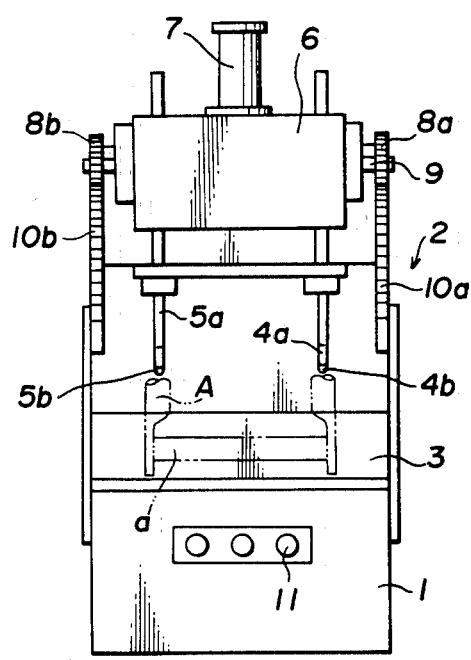
FIG. 1 is a front view of welding equipment constructed in accordance with the invention.

In the drawings, there is shown welding equipment which is used to weld a center pipe formed of a pipe and provided in a seat frame for a vehicle seat.

Reference numeral (1) designates a base body of the welding equipment which mounts a welding mechanism (2) in its upper portion and a supporting structure (3) for supporting a member to be welded in its intermediate portion. The welding mechanism (2) is provided with two pairs of welding torches, one pair of welding torches (4a) (4b) on its right side and the other pair of welding torches (5a)(5b) on its left side, so as to weld simultaneously both ends of the member to be welded or a center pipe (a) of a seat frame A. These two pairs of welding torches (4a)(4b) and (5a) (5b) are arranged in front and rear positions of both side portions of a movable member (6) such that the nozzles of each pair of welding torches are opposed to and spaced about 90 degrees apart from each other with regard to a circular periphery to be welded. These welding torches (4a)–(5b) are adapted to be moved upwardly or downwardly by a cylinder (7) relative to the movable member (6). This movable member (6) mounts on its both side surfaces pinions (8a) and (8b) by means of a shaft (9). Such pinions (8a),(8b) are intermeshed with arc-shaped racks (10a),(10b) provided in the upper portion of the base body (1), respectively. Each of these arc-shaped racks (10a),(10b) has the same center as that of the circular periphery to be welded.

Pinions (8a),(8b) can be rotated by a motor (not shown) which is provided within the movable member (6) and is connected to the shaft (9). Rotation of the pinions (8a),(8b) along with their respective intermeshed arc-shaped racks (10a),(10b) causes the movable member (6) to move longitudinally of the welding equipment along the arcs of the arc-shaped racks (10a),(10b).

Figure 3A:
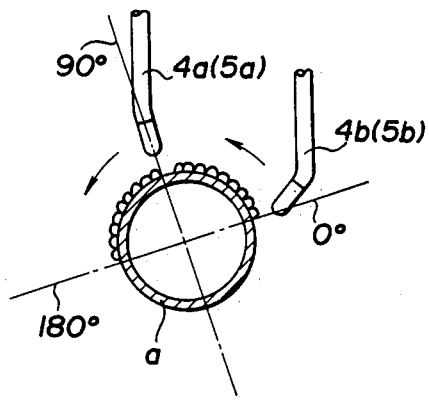
FIGS. 3(A) and 3(B) are explanatory views respectively illustrating how the welding equipment of the invention performs its welding operation over a circular periphery to be welded; and, FIG. 4 is a front view of a seat frame which is welded by the welding equipment of the invention.
Figure 2:
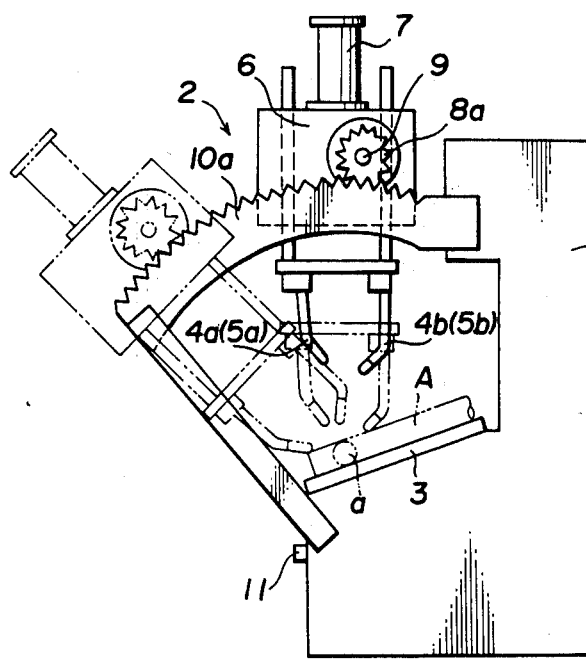
FIG. 2 is a side elevation of the welding equipment shown in FIG. 1.
Figure 3B:
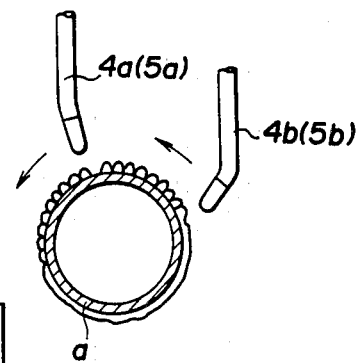

With reference to FIGS. 2, 3(A) and 3(B), the operation of the welding equipment of the invention will now be described. A member to be welded or the center pipe (a) is first located in its given position within a jig provided in the support structure (3) of the base body (1) in which a mating member to be welded or the seat frame A has been previously located, and then a start switch (11) is switched on. This turning of the start switch (11) activates the cylinder (7) for initiation of a welding operation. In particular, when the cylinder (7) is actuated by the operation of the start switch (11), as shown by two-dot chained lines in FIG. 2, the welding torches (4a)–(5b) are lowered and their respective nozzles are positioned such that they correspond to locations to be welded or joint portions between the seat frame A and center pipe (a). In this state, welding flames are jetted out from the nozzles of the welding torches (4a),(4b),-(5a),(5b) respectively and applied against the portions to be welded, and, at the same time, the movable member (6) starts its rotational movement by means of the intermeshed rotation of the pinions (8a),(8b) and the racks (10a),(10b). With this rotational movement of the movable member (6), the nozzles of the welding torches (4a),(4b),(5a),(5b) change their positions relative to the portion being welded respectively. In particular, the leading or front-side welding torches (4a),(5a) move from a center position (90-degree position) in a half-round portion to be welded to a front end position (180-degree position) therein respectively, and the following or rear-side welding torches (4b),(5b) each travels from a rear end position (0-degree position) in the same half-round portion to be welded to the center position (90-degree position) therein, so that the whole half-round portions to be welded are welded continuously and simultaneously by such front and rear welding torches (4a),(5a) and (4b),(5b).

After the half-round portion to be welded of the seat frame A and the center pipe (a) has been fully welded, the welding torches (4a),(4b),(5a),(5b) are caused to stop jetting out their welding flames respectively and the cylinder (7) is actuated to raise up these welding torches. In synchronization with this upward movement, the movable member (6) is returned rearwardly along the arc-shaped racks (10a),(10b) since the pinions (8a),(8b) intermeshed with these rack are rotated in the opposite direction due to the reversed driving of the motor (not shown). After the movable member (6) has been returned, the seat frame A is reversed with regard to the jig in the supporting structure (3) and set again into the same jig. Next, in the same manner as described above, the welding torches (4a),(4b),(5a),(5b) are lowered down and are caused to jet out their welding flames again respectively, and at the same time, the movable member (6) is also again moved rotationally in a forward direction, so that the other half-round portion to be welded can be welded by halves or by two ranges of 90 degrees separately but simultaneously by the leading and following welding torches (4a),(5a) and (4b),(5b).

In this manner, the entire periphery of the joint portion between the seat frame A and the center pipe (a) can be fillet-welded.

Figure 4:
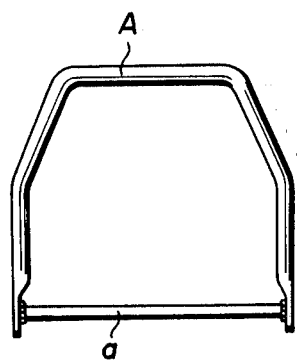

In FIG. 4, there is shown a seat frame A welded by the welding equipment of the invention.

Although the illustrated welding equipment of the invention is arranged such that they can weld two portions, i.e., both ends of the center pipe (a) simultaneously, when it is necessary to weld only one portion, only one pair of welding torches have to be mounted to a movable member in their respective predetermined front and rear positions.

As can be seen from the foregoing description, in accordance with the present invention, a half round section of a circular periphery of a pipe to be welded, i.e., a range of 180 degrees is welded by means of a pair of front and rear welding torches in a simultaneous and corresponding way with each welding torch covering its given range of about 90 degrees, that is, a half of the half round section. Thus, the range of movement of each of the welding torches employed in the invention is decreased to approximately a half when compared to that of the welding torch in the prior art welding equipment which is structured to weld a half round section of a circular periphery to be welded continuously by a single welding torch. This permits reduction of the welding time and thus can provide an improved working efficiency.

Also, the smaller the range of movement of the welding torch is, the smaller the size of the whole welding equipment is. Thus, due to the reduced range of movement of the welding torch, the whole welding equipment of the invention can be compactly designed. Such compact design allows reduction of costs and is also advantageous in installation since it is not restricted by space.

What is claimed is:

1. A fillet welding device for welding each end of a first workpiece of circular cross-section to respective separated portions of a second workpiece so that said first workpiece is transversely rigidly welded between said separated portions, said device comprising:
   a base for holding said first and second workpieces such that said first workpiece transversely extends between said first and second separated portions;
   a pair of arcuate gear racks separated from one another along the axis of said first workpiece and having a radius of curvature whose center is coincident to the axis of said first workpiece;
   a movable member disposed between and supported by said pair of gear racks and including (a) a pair of pinion gears each intermeshed with a respective one of said gear racks, (b) forward and rearward pairs welding torch means extending from said movable member each having a welding tip disposed 90° from the other welding tip relative to the circular first workpiece, each said pair of welding torch means for welding one end of said first workpiece to a respective one of said separated portions of said second workpiece along a 180° weld line therebetween, (c) motor means housed within said movable member and having a pair of shafts respectively connected to said pair of pinion gears for rotatably driving said pair of pinion gears to cause said movable member to traverse an arc defined by said pair of gear racks wherein each said forward and rearward pairs of welding torch means responsively traverses a respective 90° of said respective weld lines to thereby collectively traverse 180° of said respective weld lines whereby said ends of said first workpiece are welded to said respective separated portions of said second workpiece.

2. A fillet welding device as in claim 1 wherein said movable member further includes (d) cylinder means for moving each said forward and rearward pairs of welding torch means between a raised position wherein said forward and rearward pairs of welding torch means are separated from said respective weld line and a welding position wherein said forward and rearward pairs of welding torch means are in confronting relationship to said respective weld lines.

* * * * *